Oct. 17, 1967 G. L. MATTHAEI ET AL 3,348,173

INTERDIGITAL FILTERS WITH CAPACITIVELY LOADED RESONATORS

Filed May 20, 1964

INVENTORS,
GEORGE L. MATTHAEI &
LLOYD A. ROBINSON.

BY: Harry M. Saragovitz, Edward J. Kelly, Herbert Berl & Julian C. Keppler

ATTORNEYS 3,348,173

INTERDIGITAL FILTERS WITH CAPACITIVELY LOADED RESONATORS

George L. Matthaei, Menlo Park, and Lloyd A. Robinson, Mountain View, Calif., assignors to the United States of America as represented by the Secretary of the Army Filed May 20, 1964, Ser. No. 369,031
4 Claims. (Cl. 333—73)

ABSTRACT OF THE DISCLOSURE

A microwave strip-line interdigital type band pass filter having capacitively coupled elements. A plurality of parallel conductors extend between a pair of blocks which separate two parallel ground planes. The conductors at one end are connected directly to one block and at the other end are capacitively coupled to the other block by extending into close proximity to the block to form a gap. The conductors alternately extend in opposite directions.

This invention relates to microwave pass-band filters and more particularly to strip-line interdigital type band-pass filters.

In the field of microwave filters the interdigital line structure has shown many useful properties as a band-pass filter. Such structures are the subject of co-pending application Ser. No. 263,363, filed Mar. 6, 1963, by John T. Bolljahn and George L. Matthaei. Such interdigital structures as in the above-noted application use coupled-line elements as resonators that are approximately quarter-wavelength long at the center frequency of the band-pass. This limitation can be avoided and the size of the filters reduced considerably as in the present invention, by capacitively loading the open-circuited end of the resonator elements. Such an improved structure will also enhance the filter characteristics as well as reduce the size of the overall device.

It is therefore an object of the present invention to provide an interdigital microwave band-pass filter which is compact and has relatively non-critical manufacturing tolerances.

It is another object of the present invention to provide an interdigital microwave band-pass filter which has relatively wide stop bands.

It is still another object of the present invention to provide an interdigital microwave filter wherein the rates of cutoff and the strength of the stop-bands are enhanced by multiple-order poles of attenuation at zero frequency and within the stop-bands above the first pass-band.

It is a further object of this invention to provide an interdigital microwave filter which can be fabricated in structural forms which are self-supporting so that dielectric material need not be used.

Other objects and many of the attendant advantages of this invention will be readily appreciated as the same becomes better understood by reference to the following detailed description when considered in connection with the accompanying drawings in which like reference numerals designate like parts throughout the figures thereof, and wherein.

Figure 4:
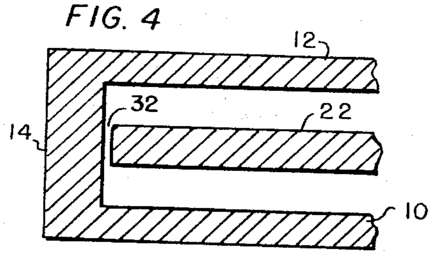
Figure 5:
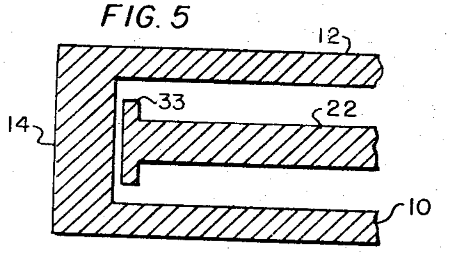
Figure 7:
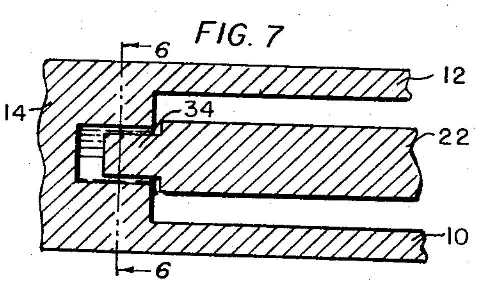

FIGS. 4, 5, and 7 are modifications of the capacitor structures.

Figure 6:
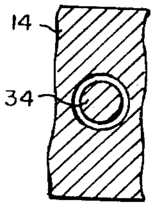

FIG. 6 is a view taken on the line 6—6 of FIG. 7.

Figure 1:
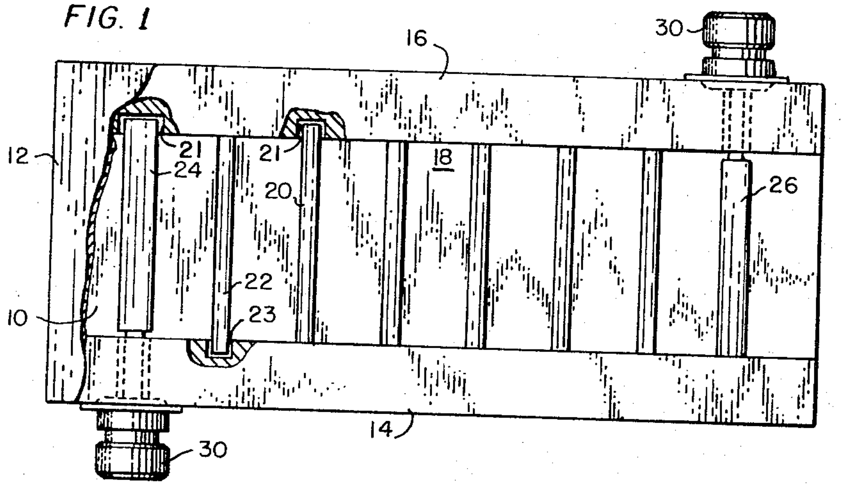
FIG. 1 shows a plan view of an embodiment of the invention.

Referring now to FIG. 1, there is shown at 10 and 12 a pair of spaced parallel ground planes hereinafter referred to as lower and upper ground planes, respectively. Parallel arranged metallic spacer and short circuiting blocks 14 and 16 are provided intermediate the ground planes 10 and 12 and are in electrical contact therewith. Centrally positioned intermediate upper and lower ground planes 10 and 12 midway therebetween is an interdigital line 18. As shown, the interdigital line 18 comprises one set of spaced metallic bars 20 which are connected to and extend from block 14 into recesses 21 in block 16, and a second set of spaced metallic bars 22 which are connected to and extend from block 16 into recesses 23 in block 14. The bars 20 and 22 are therefore capacitively coupled at one end to the blocks 16 and 14 respectively while the other ends are directly coupled to bars 14 and 16 respectively. It can readily be seen that because of these lumped capacitor elements, the length of resonant bars 20 and 22 may be made less than a quarter-wavelength while still being resonant at the desired frequency. Coupling of energy between resonators is achieved by means of the fringing electric and magnetic fields between adjacent bars 20 and 22. Also provided is an input coupling bar 24 which extends from the center conductor to a coaxial connector 30 through block 14 and into a recess 21 in block 16. An output bar 26 is provided at the other end and extends through block 16 and into block 14. The outer conductors of connectors 30 are connected to blocks 16 and 14.

Figure 2:
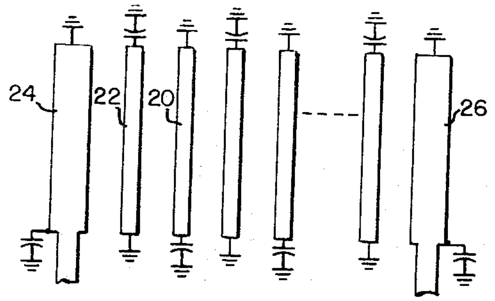
FIG. 2 is a schematic representation of another embodiment of the present invention.
Figure 3:
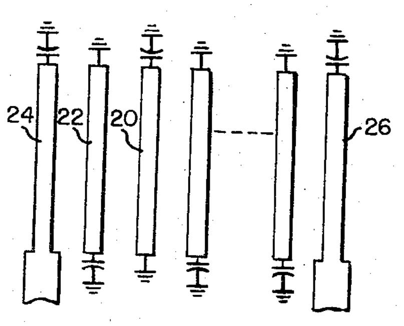
FIG. 3 is a schematic representation of the device shown in FIG. 1.

Of course, as shown in FIG. 2 the capacitive loading structure could be reversed on each element and the end bars 24 and 26 may be grounded for matching purposes. The circuit of FIG. 3 is a schematic showing of the device of FIG. 1. Here it can be seen that the ends of bars 24 and 26 are capacitively loaded to ground.

The device of FIG. 1 represents one form of structure which the capacitors may take. FIGS. 4, 5, and 7 show other modifications for obtaining the same result. In FIG. 4 the end of bar 22 is mounted adjacent block 14 to define a gap 32. Of course the smaller the gap 32 the larger will be the capacitance. The capacitance can be further increased by increasing the effective area such as shown in FIG. 1 where the end of the bar is extended into a recess. The drilling of recesses 21 and 23 can be avoided while still increasing the effective area by providing a plate-like structure 33 on the end of the bars as shown in FIG. 5. Of course, in some applications the added weight and fabrication of the plate 33 will be undesirable and the structure of FIG. 7, where a reduced diameter portion 34 is provided, may be used. Here the surface area is increased considerably without providing any excess weight. A recess is provided in block 14 for accepting the portion 34.

As indicated above capacitively loaded interdigital filters have a number of distinct advantages over and above the reduction in size of the overall device. The more the resonators are shortened by capacitive loading, the higher in frequency will be the second pass-band. With quarter-wavelength resonators the second pass-band has a center frequency whose wavelength is four-thirds the length of the resonator bars 20 and 22. This frequency will be three times the center frequency of the first pass-band. However, with the length of the resonator equal to, for example, one-eighth the wavelength of the center of the first pass-band, the second pass-band will be extended between 4 and 4.5 times the center frequency of the first pass-band. This may be seen by observing that the first pass-band occurs at one-eighth the wavelength and the second pass-band will occur at five-eighths the wavelength assuming that the capacitive reactance remains constant. This would result in an increase in frequency of five times. However, the capacitive reactance changes with frequency and reduces this value to 4 or 4.5 times the frequency of the first pass-band. Also, between the first and second pass-bands there will be multiple-order poles of attenuation. This feature will result in enhanced cutoff rates and stop-band strength.

While there has been described what is at present considered to be the preferred embodiment of this invention, it will be obvious to those skilled in the art that various changes and modifications may be made therein without departing from the invention. Tuning screws for example may be added to adjust the size of gaps 32. The bars 20 and 22 may also be made adjustable so as to be adjustably inserted into recesses 21 and 23. It is therefore aimed in the appended claims to cover all such changes and modifications as fall within the true spirit and scope of the invention.

What is claimed is:

1. A strip-line microwave filter adapted to pass a prescribed band of frequencies comprising a pair of spaced parallel ground planes, spaced parallel metallic blocks intermediate said ground planes and in electrical contact therewith, an interdigital line comprising two interleaving sets of parallel arranged metallic bars, one set of said bars at one end being affixed to one of said metallic blocks and extending toward the other said metallic block and into recesses formed therein, the other set of said bars at one end being affixed to said other metallic block and extending towards said one metallic block and extending into recesses formed therein, the walls of said recesses being separated from said other end of said bars a slight distance to form a narrow gap whereby said gap defines a capacitive coupling, each of said metallic bars being less than one-quarter wavelength of the mid-band frequency of said band-pass, and microwave energy coupling means at respective ends of said interdigital line.

2. The filter in accordance with claim 1 and wherein the other end of said bars is reduced in cross-sectional area with respect to the cross-sectional area of the remainder of said bars.

3. A strip-line microwave filter adapted to pass a prescribed band of frequencies comprising a pair of spaced parallel ground planes, spaced parallel metallic blocks intermediate said ground planes and in electrical contact therewith, an interdigital line comprising two interleaving sets of parallel arranged metallic bars, one set of said bars at one end being affixed to one of said metallic blocks and extending toward the other said metallic block, the other set of said bars at one end being affixed to said other metallic block and extending towards said one metallic block, said other ends of said one set and said other set of bars being capacitively coupled to said other block and said one block respectively, each of said metallic bars being less than one-quarter wavelength of the mid-band frequency of said band-pass, and microwave energy coupling means at respective ends of said interdigital line, said respective microwave energy coupling means comprises respective metallic input and output bars at respective ends of said interdigital line and coplanar therewith, said input bar having one end connected to said one metallic block and the other end capacitively coupled to said other metallic block and the center conductor of a first coaxial line, said output bar having one end connected to said other metallic block and the other end capacitively coupled to said one metallic block and the center conductor of a second coaxial line, and said outer conductors of said first and said second coaxial lines being connected to said other and said one metallic blocks respectively.

4. A strip-line microwave filter adapted to pass a prescribed band of frequencies comprising a pair of spaced parallel ground planes, spaced parallel metallic blocks intermediate said ground planes and in electrical contact therewith, an interdigital line comprising two interleaving sets of parallel arranged metallic bars, one set of said bars at one end being affixed to one of said metallic blocks and extending toward the other said metallic block, the other set of said bars at one end being affixed to said other metallic block and extending towards said one metallic block, said other ends of said one set and said other set of bars being capacitively coupled to said other block and said one block respectively, each of said metallic bars being less than one-quarter wavelength of the mid-band frequency of said band-pass, and microwave energy coupling means at respective ends of said interdigital line, said respective microwave energy coupling means comprises respective metallic input and output bars at respective ends of said interdigital line and coplanar therewith, said input bar having one end capacitively coupled to said one metallic block and said output bar having one end capacitively coupled to said other metallic block, the other ends of said input and output bars being connected to the center conductor of first and second coaxial lines respectively.

References Cited

UNITED STATES PATENTS

| | | | |
|---|---|---|---|
| 2,819,452 | 1/1958 | Arditi | 333—73 |
| 2,827,588 | 3/1958 | Guevard et al. | 315—3.5 |
| 2,915,716 | 12/1959 | Hattersley | 333—73 |
| 2,964,718 | 12/1960 | Packard | 333—73 |
| 2,984,802 | 5/1961 | Dyer et al. | 333—73 |
| 3,104,362 | 9/1963 | Mattliei | 333—73 |

HERMAN K. SAALBACH, *Primary Examiner.*

C. R. BARAFF, *Assistant Examiner.*